United States Patent
Igi et al.

(10) Patent No.: US 7,006,570 B2
(45) Date of Patent: Feb. 28, 2006

(54) VIDEO SIGNAL CODING METHOD AND VIDEO SIGNAL ENCODER

(75) Inventors: Nobuhiro Igi, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 09/905,051

(22) Filed: Jul. 13, 2001

(65) Prior Publication Data

US 2002/0021753 A1 Feb. 21, 2002

(30) Foreign Application Priority Data

Jul. 14, 2000 (JP) .......................... P2000-215115

(51) Int. Cl.
    *H04N 7/12* (2006.01)
(52) U.S. Cl. ............................... 375/240.12
(58) Field of Classification Search .......... 375/240.01, 375/240.23
    See application file for complete search history.

(56) References Cited

U.S. PATENT DOCUMENTS

| | | | | |
|---|---|---|---|---|
| 5,828,426 A | * | 10/1998 | Yu | 375/240.26 |
| 5,978,029 A | * | 11/1999 | Boice et al. | 375/240.14 |
| 6,167,087 A | * | 12/2000 | Kato | 375/240.03 |
| 6,363,114 B1 | * | 3/2002 | Kato | 375/240.04 |

* cited by examiner

*Primary Examiner*—Vu Le
*Assistant Examiner*—Dave Czekaj
(74) *Attorney, Agent, or Firm*—Oblon, Spivak, McClelland, Maier & Neustadt, P.C.

(57) ABSTRACT

An input video signal is coded by a 1-pass type coding system highly efficiently by taking the proportions of the components of the input image. The coding difficulty level computation circuit 33 determines the coding difficulty level d of the input moving image signal S1 and sends it to the amount of allocated bits computation circuit/controller 34. The amount of allocated bits computation circuit/controller 34 determines a reference value of amount of allocated coding bits on the basis of the coding difficulty level d and, when shifting the reference value to the actual amount of allocated coding bits b_x, it stores part of the sum of the amounts of allocated bits a per unit time for a certain period of time as virtual buffer in advance and the actual reference value of the amount of allocated coding bits is obtained by dividing the sum of the amounts of allocated coding bits per unit time less the part stored as virtual buffer by said period of time. As long as the virtual buffer is positive, the provision of an amount of bits exceeding said reference value is permitted.

14 Claims, 10 Drawing Sheets

VIDEO SIGNAL CODING METHOD AND VIDEO SIGNAL ENCODER

BACKGROUND OF THE INVENTION

1. Field of the Invention

This invention relates to a video signal coding method and a video signal encoder that can highly efficiently and effectively encode digital signals at the transmission side. More particularly, the present invention relates to a video signal coding method and a video signal encoder adapted to control a coding operation conducted at a variable bit rate on a single path when coding moving picture signals.

2. Description of the Related Art

Since digital video signals involve a large amount of data, the use of a high efficiency coding means that can encode a digital video signal at a high compression ratio is indispensable particularly when recording signals on a small recording medium having a small storage capacity. High efficiency coding methods utilizing the correlation of video signals have been proposed as solutions for meeting the need. One of such solutions is the use of the MPEG system. The MPEG (Moving Picture Image Coding Experts Group) system was proposed as standard system as a result of the discussion in ISO-IEC/JTC1/SC2/WG11. It is a hybrid system realized by combining motion compensation predictive coding and discrete cosine transform (DCT). With the MPEG system, firmly the redundancy is eliminated on the time base by determining the inter-frame differences of video signals and subsequently on the space base by means of discrete cosine transform to efficiently encode video signals.

Generally, video signals do not remain invariable and the amount of information of each picture changes with time. Thus, it is known that a high image quality can be realized by means of variable bit rate coding rather than by means of constant bit rate coding if a same amount of codes is used.

For example, 2-pass type variable bit rate coding is generally used for video signals to be recorded on a DVD-video. The 2-pass type involves two coding operations including one for determining the amount of codes and one to be conducted by variably controlling the bit rate on the basis of the determined amount of codes. While this technique provides the advantage of effectively exploiting the total amount of coding bits that can be used, it is accompanied by the disadvantage that a time period more than twice of the duration of the moving picture sequence is required for the processing operation so that this technique is not suited to real time processing operations.

The specifications and the drawings of Japanese Patent Applications Laid-Open Nos. 7-311418 and 9-113141 disclose a 1-pass type variable bit rate coding method in an attempt for reducing the processing time.

FIG. 1 of the accompanying drawings schematically illustrates the configuration of an encoder for moving pictures realized by applying the known 1-pass type variable bit rate coding method and FIG. 2 sows a flow chart of the processing operation using the 1-pass type variable bit rate coding method.

Referring to FIG. 1 showing a block diagram of a known moving picture encoder, the input moving image signal applied to input terminal 200 is sent to coding difficulty level computation circuit 201 and delay circuit 203. Then, the output of the coding difficulty level computation circuit 201 is sent to amount of allocated bits computation circuit 202 that is adapted to compute the amount of allocated bits per unit time and the output of the amount of allocated bits computation circuit 202 is sent to moving image coding circuit 204. The moving image coding circuit 204 encodes the output signal of the delay circuit 203 as a function of the amount of allocated bits as output from the amount of allocated bits computation circuit 202 and outputs the coded signal as coded bit stream from terminal 205.

Now, the operation of the moving picture encoder of FIG. 1 will be described by referring to the flow chart of FIG. 2.

Referring to FIG. 2, in Step S401, the moving picture signal fed to the terminal 200 is input to the coding difficulty level computation circuit 201 to determine the coding difficulty level d of the input image per unit time, which unit time may typically be 0.5 seconds. The computing operation of the coding difficulty level computation circuit 201 is typically performed by encoding the input moving picture, fixing the quantization step, and computing the amount of generated codes in a predetermined period of time.

Then, in Step S402, the amount of allocated bits computation circuit 202 computationally determines the amount of allocated bits b relative to the coding difficulty level d obtained by the coding difficulty level computation circuit 201. For this operation, the relationship between the coding difficulty level d and the amount of allocated bits b observable when a reference moving image sequence is subjected to variable bit rate coding at a predetermined average bit rate is obtained in advance for each unit time. The amount of allocated bits per unit time for the reference moving image sequence is held to less than the storage capacity of the recording medium to be used for signal recording. FIG. 3 shows a graph that illustrates the relationship between the coding difficulty level d and the amount of allocated bits b.

Referring to FIG. 3, the horizontal axis of the graph represents the coding difficulty level d and the vertical axis of the graph represents the probability of appearance h (d) of coding difficulty level d in the reference moving image sequence. The amount of allocated bits for any given coding difficulty level is computed on the basis of function b (d). This function is empirically obtained on a trial and error basis by conducting a number of experiments of encoding many moving image sequences (e.g., movies) at a predetermined average bit rate and evaluating the image quality of each sequence. In other words, it represents a generic relationship applicable to any moving image sequences that may be observable in this world. The specification and the drawings of Japanese Patent Application Laid-Open No. 7-311418 discloses a method of obtaining such a function. Thus, the amount of allocated bits computation circuit 202 determines the amount of allocated bits b for the coding difficulty level d per unit time of the image that is input through the terminal 200 on the basis of the relationship as illustrated in FIG. 3.

Since the processing operation of the coding difficulty level computation circuit 201 and the amount of allocated bits computation circuit 202 on the input image of a unit time length completes within the unit time, the delay circuit 203 is provided in the 1-pass type moving picture encoder to delay the input of the image signal to the moving image coding circuit 204 by a unit time.

Then, in Step S40, the moving image coding circuit 204 encodes the input moving image of each unit time so as to show the amount of allocated bits as given by the amount of allocated bits computation circuit 202 for the moving image. In other words, the moving image coding circuit 204 encodes the input moving image of each unit time, using the quantization step size that is defined on the basis of the amount of allocated bits.

With such a 1-pass type method, it is possible to perform an operation of variable bit rate coding on the input video signal with an optimal amount of allocated bits that corresponds to the coding difficulty level of the signal substantially on a real time basis.

Meanwhile, although the relationship of FIG. 3 is applicable to almost all moving image sequences, it is not to certain special sequences where the total amount of bits generated by the moving image coding circuit 204 exceeds the total amount of available bits so that the moving image sequence cannot be recorded on the intended recording medium.

The conventional 2-pass type method cannot be used for encoding a moving image sequence having a predetermined time length at a variable bit rate on a real time basis and recording it in a recording medium having a certain level of storage capacity. On the other hand, while the conventional 1-pass type method can encode almost all moving image sequences at a variable bit rate on a real time basis and store a sequence having a predetermined time length in a recording medium having a certain level of storage capacity, it is not applicable to certain special sequences where the total amount of coded bits exceeds the total amount of available bits so that the sequence having a predetermined time length cannot be recorded on a recording medium.

In view of this problem, there has been proposed a technique of guaranteeing that a signal having a predetermined time length can be recorded on a recording medium having a certain level of storage capacity by controlling the amount of actually allocated bits in such a way that the sum of the bits generated when a signal having a time length good for recording on a recording medium is encoded is less than the amount of bits that can be used for recording the signal on the recording medium.

More specifically, assuming that the input signal of each unit time is encoded with a predetermined amount of allocated bits b_av, the sum of the amounts of allocated bits B_av down to the current time and the sum of the amounts of actually generated coding bits B_gene down to the current time are compared and if the value (B_av−B_gene) is positive, it is permitted to give an amount of allocated bits more than b_av for the guarantee.

The predetermined amount of allocated bits b_av per unit time is determined by the formula below;

$$b\_av = T\_unit\ time \times B\_V / T\_SEQ$$

where B_V:the amount of bits available to recording the moving image in the signal recording medium, T_SE:the time length of a moving image sequence that can be recorded in the signal recording medium, and T_unit time:unit time length.

The input signal is pre-filtered on the basis of the information obtained when shifting the reference value of the amount of allocated coding bits to the actual value of the amount of allocated coding bits and then the obtained signal is coded to make the degradation of the signal due to the coding less conspicuous. More specifically, when the actual value of the amount of allocated coding bits is made smaller than the reference value of the amount of allocated coding bits, the degradation of the signal due to the coding less conspicuous by causing the input image to pass through a low pass filter.

When the operation of coding a signal and recording the coded signal on a recording medium is divided into segments of operation that are to be carried out sequentially, the above (B_av−B_gene) or a corresponding value is stored in the recording medium. Thus, when the signal is stored in a vacant storage area of the recording medium, the above (B_av−B_gene) or the corresponding value is read out from recording medium and the amount of bits allocated per unit time to the signal is computed on the basis of the read out value so that the storage capacity of the recording medium can be utilized effectively and efficiently.

When the input signal is that of a moving image, the coding difficulty level is determined on the basis of the information on the image characteristics of the input image for every predetermined period of time and the signal is coded on the basis of the amount of allocated coding bits that reflects the visual characteristics of human being, using the information on the image characteristics.

FIG. 4 shows a block diagram of an encoder for moving pictures realized by applying a 1-pass type variable bit rate coding method that guarantees that a signal having a predetermined length on a recording medium having a certain level of storage capacity.

Referring to FIG. 4, the moving image signal S1 input to terminal 101 is sent to a motion vector computation circuit 102. The motion vector computation circuit 102 outputs information on the motion vector (the motion vector and the prediction error) of the input moving image. The moving image signal and the motion vector information are then input to a coding difficulty level computation circuit 103. The coding difficulty level computation circuit 103 computes the coding difficulty level d per unit time of the input moving image S1. The obtained coding difficulty level d is then input to the amount of allocated bits computation circuit 104 that computes the amount of allocated bits per unit time. More specifically, the amount of allocated bits computation circuit 104 computes reference value b of the amount of bits allocated per unit time for coding the input image. The reference value b of the amount of allocated bits is then input to a controller 105. The controller 105 shifts the reference value b of the amount of allocated bits to the actual value b_x of the amount of allocated bits and outputs it. The controller 105 also outputs information S4 on the processing operation of a pre-filter 107. A Delay circuit 106 delays the input of the input moving image signal S1 having the length of the unit time to the pre-filter 107 by the unit time, or until the processing operation of the amount of allocated bits computation circuit 104 and that of the controller 105 are completed. The input moving image signal S2 delayed by the delay circuit 106 is processed by the pre-filter 107 according to the processing information S4 and the pre-filter 107 outputs the processed signal S3. The pre-filter 107 is adapted to change its filtering characteristics according to the processing information S4 so as to prevent the possible degradation of the input moving image signal at the time of coding by causing the signal to pass through a low pass filter when the input moving image is a complex one and requires a large amount of bits allocated to it per unit time. Moving image coding circuit 108 encodes the processed image signal S3 so as to make it show the amount of allocated bits b_x per unit time. The moving image coding circuit 108 then outputs coded bit stream S5 and the amount of generated bits b_gene per unit time, of which the coded bit stream S5 is output from terminal 109.

With such a 1-path type method, the actual value of the amount of allocated bits can be controlled in such a way that input moving image can be coded at a variable bit rate by using an optimal amount of allocated bits according to the coding difficulty level of the signal on a real time bases and the total sum of the amounts of generated bits obtained when coding the signal having a time length that allows the signal to be recorded on the recording medium is less than the amount of bits available for recording the signal on the recording medium.

However, the above described method for determining the amount of allocated bits according to the coding difficulty level is accompanied by a problem that, when the input moving image signal shows a high coding difficulty level concentrative in the initial stages, (B_av−B_gene) would not show a positive value and hence it is not possible to improve the image quality because a sufficient amount of bits cannot be allocated per unit time for the part of the image signal showing a high initial coding difficulty level if a latter part of the image signal shows a low coding difficulty level.

Additionally, there is another problem that accompanies the above method. When (B_av−B_gene) becomes positive so that it is possible to allocate an amount of bits per unit time that is greater than the ordinary level and the input moving image signal continuously shows a high coding difficulty level so that an amount of bits per unit time that is greater than the ordinary level is actually allocated but subsequently (B_av−B_gene) suddenly becomes negative on the way, the amount of allocated bits per unit time falls abruptly.

On the other hand, when the input moving image signal continuously shows a low coding difficulty level, there also arises a problem that the allocation of an amount of bits per unit time that is smaller than the ordinary level goes on to degrade the quality of the recorded image to a level lower than the image quality that is obtained when the image is coded at a fixed coding rate, although (B_av−B_gene) is positive and the amount of bits per that is allocated per unit time is greater than the ordinary level.

Additionally, there is also a problem that, since the maximum amount of allocated bits and the minimum amount of allocated bits are not defined in actual operations, there can occur parts where the amount of allocated bits is extremely large and parts where the amount of allocated bits is extremely small after the coding operation and hence it is not possible to allocate bits to the input image in a well coordinated manner.

Finally, although the image quality of an image can appear to be degraded in some parts to the visual sense of human being while it does not in some other parts if bits are allocated at a same rate, no satisfactory measures have been taken to such a problem.

SUMMARY OF THE INVENTION

In view of the above identified circumstances, it is therefore the object of the present invention to provide a video signal coding method and a video signal encoder that can allocate bits adequately and follow any changes in the coding difficulty level so that the input video signal can be coded effectively and efficiently even the input video signal concentrative shows a high coding difficulty level in the initial stages, when it is possible to allocate bits at a rate higher than the ordinary rate and the input video signal continuously shows a high coding difficulty level and when the input video signal continuously shows a low coding difficulty level.

In an aspect of the invention, the above object is achieved by providing a video signal coding method comprising:

a step of determining the coding difficulty level d of an input video signal for each unit time;

a step of determining a reference value for allocating coding bits on the basis of function b (d) for the amount of coding bits b allocated for each unit time and related in advance to the coding difficulty level d of said input video signal for each unit time;

a step of determining the actual amount of allocated coding bits b_x on the basis of the reference value; and a step of generating coded data by coding the input video signal for each unit time on the basis of said actual amount of allocated coding bits b_x.

When obtaining the actual amount of allocated coding bits on the basis of the above reference value in order to shift the reference value of the amount of allocated coding bits to the actual value of the amount of allocated coding bits, part of the sum of the amounts of allocated coding bits per unit time is stored as virtual buffer for a certain period of time in advance and the actual reference value of the amount of allocated coding bits is determined by dividing the sum of the amounts of allocated coding bits per unit time less the part stored as virtual buffer by said certain period of time. As a result, it is possible to allocate bits at a rate higher than the reference value of the amount of allocated bits per unit time if the input moving image signal continually shows a high coding difficulty level in the initial states of the coding operation that lasts for said certain period of time.

More specifically, when shifting the reference value of the amount of allocated coding bits to the actual value of the amount of allocated coding bits, part of the sum B_av of the amounts of allocated bits b_av per unit time for a certain period of time T_vbr, or $B\_av = b\_av \times T\_vbr,$ is stored as virtual buffer V_vbr in advance and the actual reference value of the amount of allocated coding bits b_real is obtained by $b\_real\ (B\_av - V\_vbr)/T\_vbr$ so that an amount of allocated bits not smaller than b_real is given as long as V_vbr>0 but an amount smaller than b_real is given otherwise.

As a result, when the coding operation is controlled on the basis of a variable bit rate, it can be guaranteed that the sum of the generated bits for said certain period of time T_vbr is less than B_av.

When correlating the coding difficulty level of the input image with the amount of allocated bits per unit time, the reference value is determined by taking the relationship of the coding difficulty level, the amount of allocated coding bits and the amount of actually generated bits of a preceding unit time and also the relationship of the coding difficulty level of the preceding unit time and that of the current unit time. As a result, the amount of allocated bits is determined by taking the coding difficulty level and the amount of allocated bits of the preceding time unit into consideration when the input video signal continuously shows a high coding difficulty level or a low coding difficulty level for some time so that a situation where the amount of allocated bits abruptly falls on the way. Additionally, if possible, a large amount of bits may be allocated when the coding difficulty level of the input video signal is low.

Still additionally, according to the invention, when bits are allocated per unit time by an amount greater than or smaller than the reference value, it is possible allocate bits in a well coordinated manner by defining in advance an upper limit and a lower limit for the amount of allocated bits per unit time as a function of the reference value. Then, a situation where an extremely large or small amount of bits are allocated locally can be effectively avoided.

Furthermore, when an amount of bits less than the reference value is allocated because the coding difficulty level is low, a lower limit may be defined as a function of the ratio of the parts where degradation due to coding is conspicuous in order to prevent a coding operation that remarkably degrade the image quality from occurring by taking the visual characteristics of the input video signal into consideration.

As pointed out above, according to the invention, when a reference value (for the amount of allocated coding bits) is determined on the basis of the amount of allocated coding bits obtained from the relationship with the coding difficulty level and the amount of actually allocated coding bits is determined on the basis of the reference, part of the sum of the amounts of allocated coding bits per unit time is stored as virtual buffer for a certain period of time in advance and the actual reference value of the amount of allocated coding bits is determined by dividing the sum of the amounts of allocated coding bits per unit time less the part stored as virtual buffer by said certain period of time As a result, it is possible to allocate bits at a rate higher than the reference value of the amount of allocated bits per unit time if the input moving image signal continually shows a high coding difficulty level in the initial states of the coding operation that lasts for said certain period of time.

When correlating the coding difficulty level of the input image with the amount of allocated bits per unit time, the reference value is determined by taking the relationship of the coding difficulty level, the amount of allocated coding bits and the amount of actually generated bits of a preceding unit time and also the relationship of the coding difficulty level of the preceding unit time and that of the current unit time into consideration. As a result, the amount of allocated bits is determined by taking the coding difficulty level and the amount of allocated bits of the preceding time unit into consideration when the input video signal continuously shows a high coding difficulty level or a low coding difficulty level for some time so that a situation where the amount of allocated bits abruptly falls on the way. Additionally, if possible, a large amount of bits may be allocated when the coding difficulty level of the input video signal is low.

Furthermore, according to the invention, a lower limit may be defined as a function of the ratio of the parts where degradation due to coding is conspicuous in order to prevent a coding operation that remarkably degrade the image quality from occurring by taking the visual characteristics of the input video signal into consideration.

Thus, according to the invention, it is possible to guarantee that an input video signal having a predetermined time length is stored in a recording medium having a certain storage capacity to effectively utilize the storage capacity of the recording a medium, while controlling the coding operation adaptively using a variable bit rate as a function of the coding difficulty level of the input video signal. BRIEF

DESCRIPTION OF THE PREFERRED EMBODIMENTS

Now, a video signal coding method and a video signal encoder according to the invention will be described by referring to the views of the accompanying drawing that illustrate preferred embodiments of the invention particularly in terms of encoding a moving image.

Figure 1:
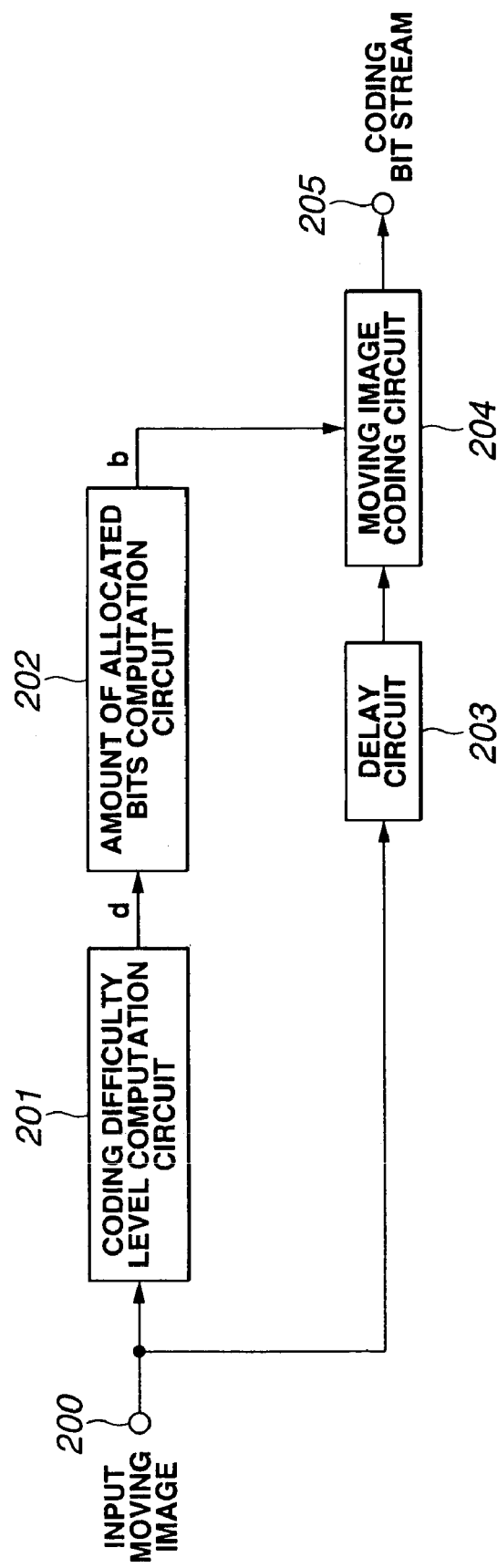
FIG. 1 is a schematic block diagram of a known moving image encoder realized by applying a conventional basic 1-pass type variable bit rate coding method.
Figure 2:
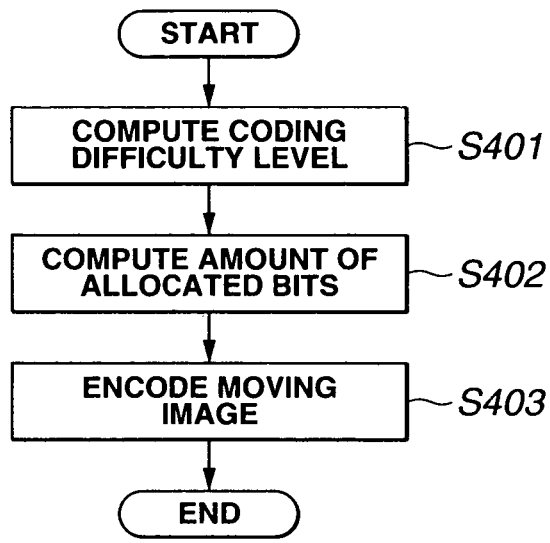
FIG. 2 is a flow chart of the conventional 1-pass type variable bit rate coding method.
Figure 3:
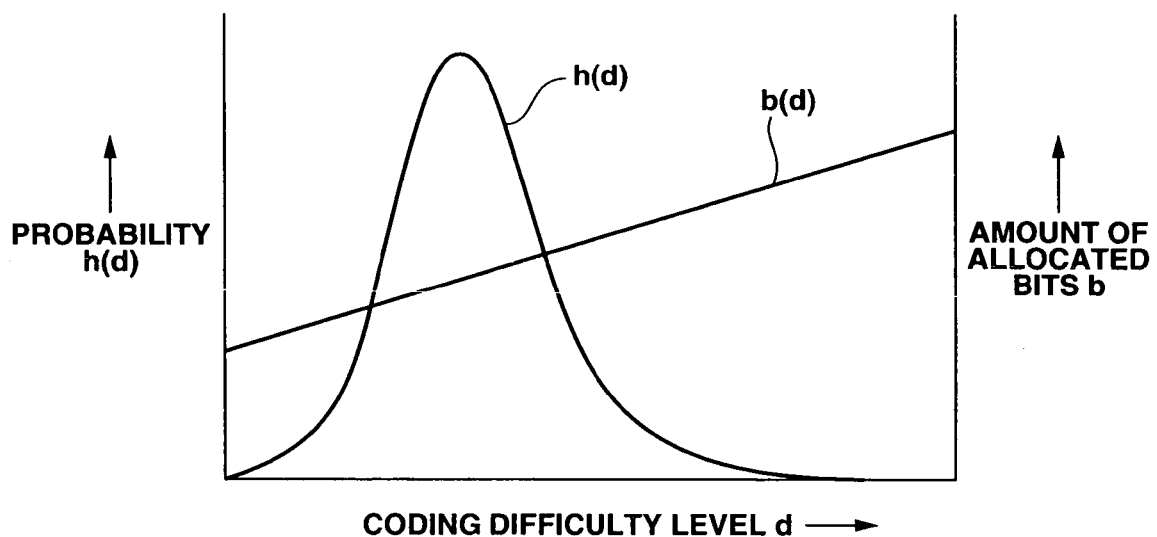
FIG. 3 is a graph of the function b (d) showing the relationship between the probability of appearance h (d) per unit time length of coding difficulty level d in the reference moving image sequence and the amount of allocated bits for a predetermined average bit rate b.
Figure 4:
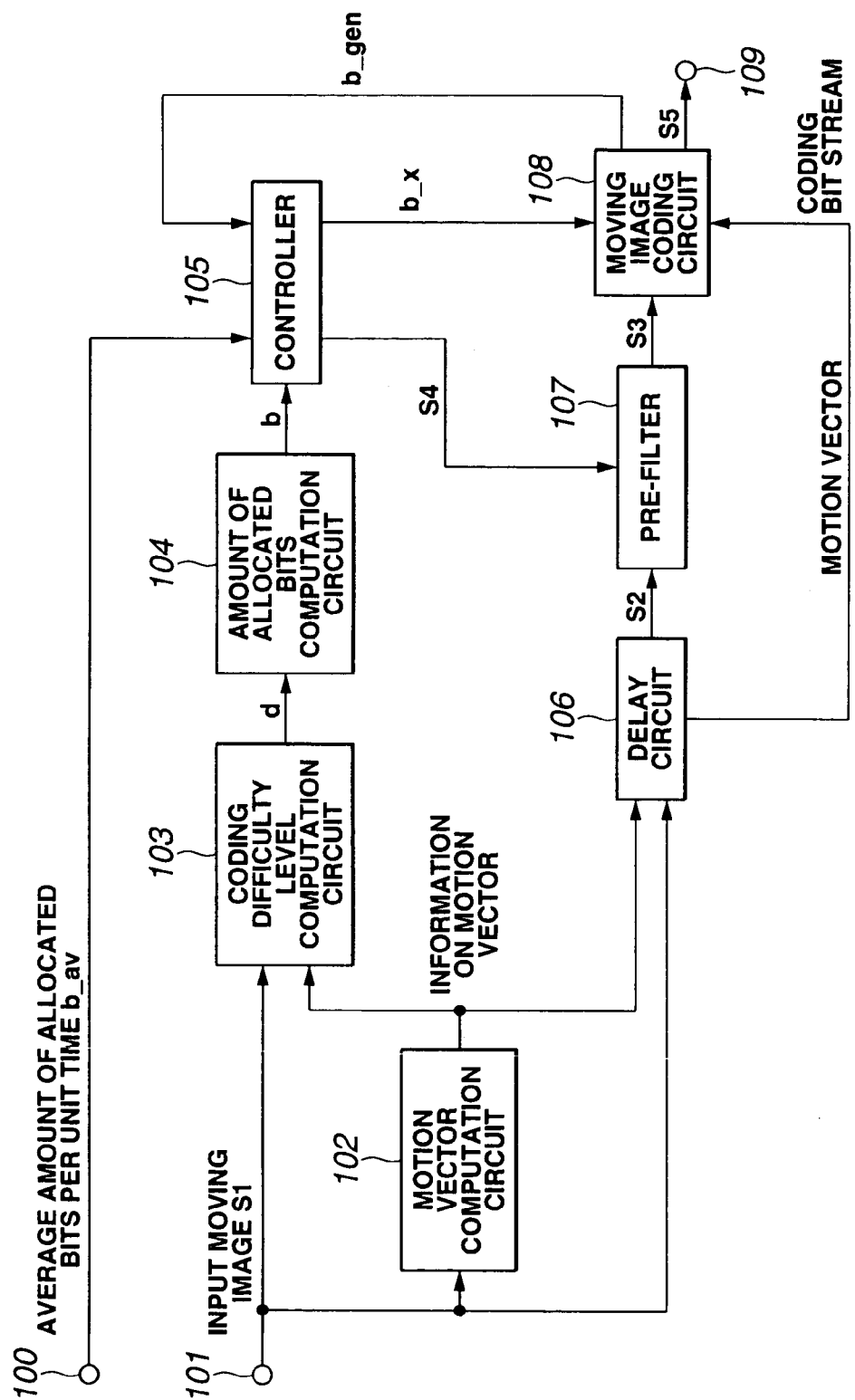
FIG. 4 is a schematic block diagram of a known moving image encoder realized by applying a conventional evolutional 1-pass type variable bit rate coding method.
Figure 5:
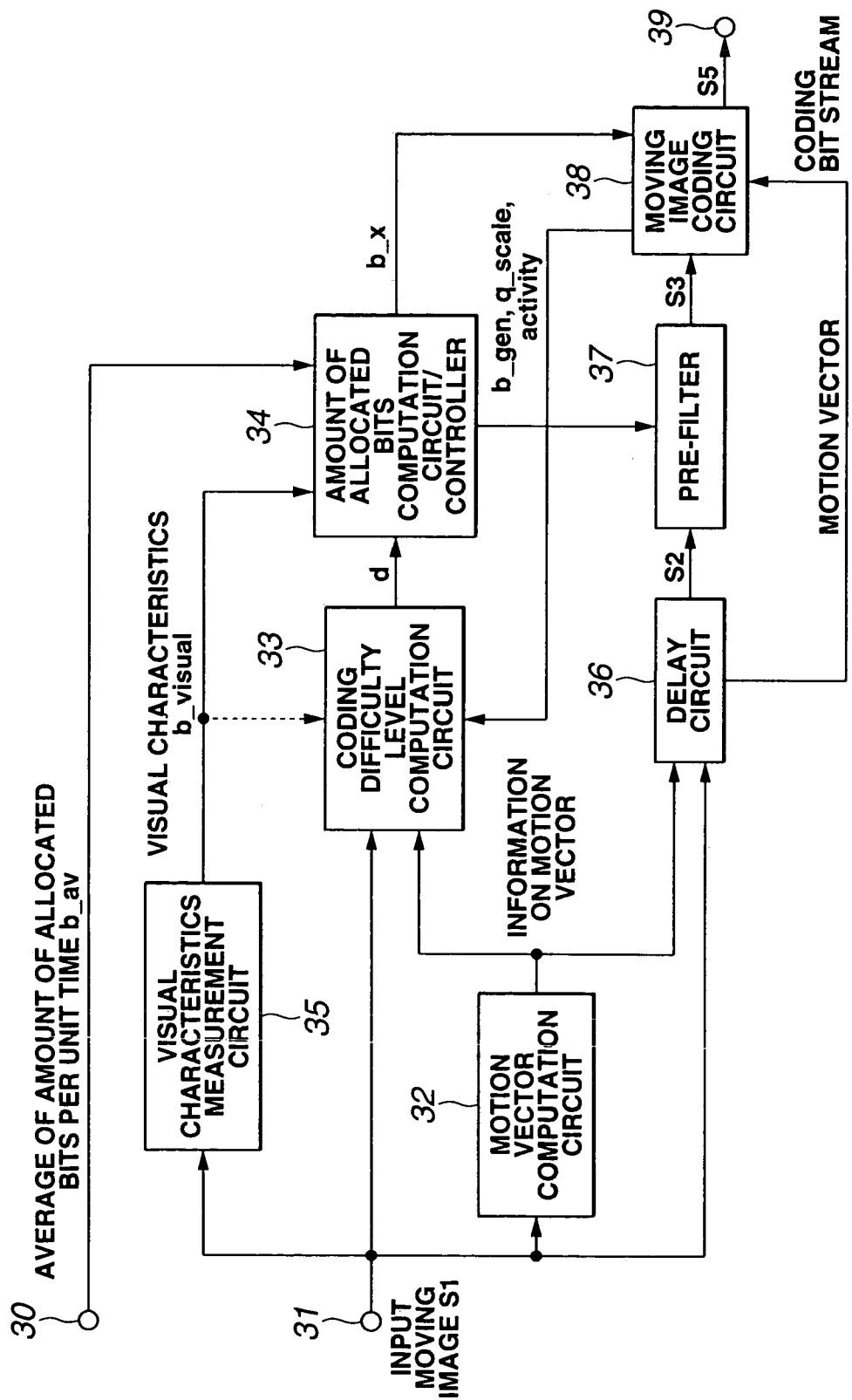
FIG. 5 is a schematic block diagram of an embodiment of moving image encoder realized by applying a video signal coding method according to the invention.

FIG. 5 is a schematic block diagram of an embodiment of moving image encoder realized by applying a video signal coding method according to the invention.

Referring to FIG. 5, moving image signal S1 input to a terminal 31 is sent to a motion vector computation circuit 32, a coding difficulty level computation circuit 33, a visual characteristics measurement circuit 35 and a delay circuit 36.

The visual characteristics measurement circuit 35 measures visual characteristics of the input moving image signal S1 and sends the obtained information on the visual characteristics R_visual to amount of allocated bits computation circuit/controller 34. The motion vector computation circuit 32 outputs the information obtained for the motion vector (the motion vector and the prediction error) of the input moving image. The information on the motion vector is sent to the coding difficulty level computation circuit 33 along with the moving image signal S1.

The coding difficulty level computation circuit 33 computes the coding difficulty level d for each unit time from the information on the motion vector sent from the motion vector computation circuit 32, the information on the amount of generated bits b_gene fed from moving image coding circuit 38 which will be described hereinafter, Q scale q_scale and the deviation of the brightness value activity. The coding difficulty level d is then input to the amount of allocated bits computation circuit/controller 34. While 1 GOP (group of pictures) according to MPEG nay typically be used for the unit time for the purpose of the invention, the present invention is by no means limited thereto.

The amount of allocated bits computation circuit/controller 34 computes the amount of bits to be allocated b_x for each unit time when coding the input moving image from the coding difficulty level d input to it, the average amount of allocated bits b_av input to it from the terminal 30 and the visual characteristics R_visual fed from the visual characteristics measurement circuit 35. The obtained amount of allocated bits b_x is then output to moving image coding circuit 38. The amount of allocated bits computation circuit/controller 34 also outputs processing information S4 to pre-filter 37.

The delay circuit 36 delays the input of the input moving image signal S1 to the pre-filter 37 by a unit time until the processing operations of the coding difficulty level computation circuit 33 and the amount of allocated bits computation circuit/controller 34 are completed. The moving image signal S2 delayed by the delay circuit 36 is then processed by the pre-filter 37 according to the processing information S4, which then outputs processing information S3 to the moving image coding circuit 38.

The moving image coding circuit 38 encodes the processed video signal S3 for each unit time in such a way that it shows the above amount of allocated bits b_x. The moving image coding circuit 38 outputs the coded bit stream S5, the amount of generated bits b_gene for each unit time, the deviation of the brightness value activity and the allocated Q scale q_scale. The coded bit stream S5 is output from the terminal 39.

With the above arrangement, the coding difficulty level computation circuit 33 and the amount of allocated bits computation circuit/controller 34 determines a reference value (e.g., a reference value for the amount of allocated coding bits) on the basis of the amount of allocated coding bits obtained from the relationship with the coding difficulty level and stores in advance part of the sum of the amounts of allocated bits per unit time for a certain period of time as virtual buffer so that the actual reference value of the amount of allocated coding bits is determined by dividing the sum of the amounts of allocated coding bits per unit time less the part stored as virtual buffer by said certain period of time.

More specifically, when determining the reference value for the amount of allocated coding bits relative to the coding difficulty level d of each unit time and shifting the reference value of the amount of allocated coding bits to the actual value of the amount of allocated coding bits b_s, part of the sum B_av of the amounts of allocated bits b_av per unit time for a certain period of time T_vbr, or $$B\_av=b\_av \times T\_vbr,$$

is stored as virtual buffer V_vbr in advance and the actual reference value of the amount of allocated coding bits b_real is obtained by $$b\_real=(B\_av-V\_vbr)/T\_vbr$$

so that an amount of allocated bits not smaller than b_real is given as long as V_vbr>0 but an amount smaller than b_real is given otherwise. While the period of time T_vbr may be about 1 minute, the present invention is by no means limited thereto.

The reference value is determined by taking the relationship of the coding difficulty level, the amount of allocated coding bits and the amount of actually generated bits of a preceding unit time and also the relationship of the coding difficulty level of the preceding unit time and that of the current unit time into consideration.

It is determined in advance that the amount of the upper limit corresponding to the amount of allocated bits b_av per unit time is given when allocating an amount of bits exceeding the above b_real and the amount of the lower limit corresponding to the amount of allocated bits b_av per unit time is given when allocating an amount of bits short of the above b_real.

Additionally, the video signal of images whose degradation due to coding can become conspicuous is provided with a lower limit for the amount of allocated bits corresponding to the possible degree of degradation, taking the visual characteristics of human being into consideration.

If the difference between the sum of the amounts of actually generated bits B_gene in the period of time and the sum of the amounts of available bits B_av in the period of time (B_av−B_gene) is positive when the coding operation in said period of time T_vbr is over, the difference is carried over and added to the sum of the amounts of available bits in the next period of time. If the sum of the amounts of available bits exceeds R_total times of the initial sum B_av as a result of carrying over the difference, the reference value of the actually allocated bits per unit time b_real is raised as a function of the ratio.

Now, the algorithm for determining the amount of allocated bits of the coding difficulty level computation circuit 33 and the amount of allocated bits computation circuit/controller 34 of FIG. 5 will be described by referring to the flow charts of FIGS. 6 through 12.

Figure 6:
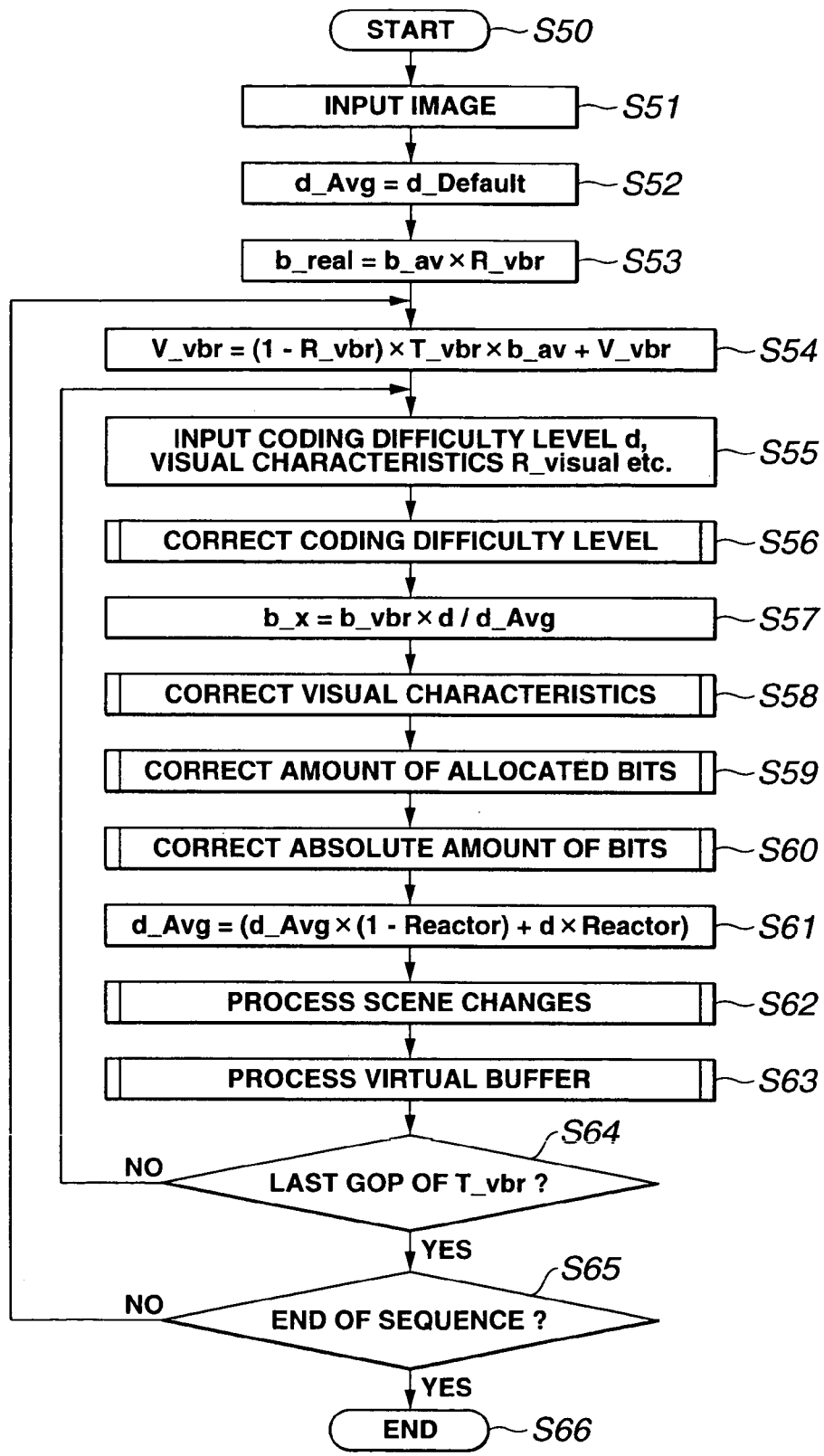
FIG. 6 is a flow chart illustrating the algorithm of the amount of allocated bits per unit time computation circuit and the controller 24 of FIG. 5.

Referring firmly to FIG. 6, the processing operation for determining the amount of allocated bits starts in Step S50 and then the coding difficulty level computation circuit 33 inputs the moving image in Step S51 and initializes the reference value of coding difficulty level d_Avg by using initial value d_Default in Step S52.

Then, in Step S53, the reference bit rate b_real when the variable bit rate is controlled is determined from the average amount of allocated bits b_av per unit time input from the terminal 30 of FIG. 5 by using formula $$b\_real=b\_av \times R\_vbr \text{ [Mbps]}.$$

Note that the ratio of the reference bit rate when the variable bit rate is controlled, or R_vbr is defined by 0<R_vbr<1. For instance, a value of R_vbr=0.9 may be used. The time period of 1 GOP (group of pictures) according to MPEG may typically used for the unit time.

In Step S54, virtual buffer V_vbr for controlling the variable bit rate is secured for the time when the control of the variable bit rate for the period of time T_vbr is started by using the formula below. If the temporally preceding coding operation has any residue in V_vbr, the residue is carried over to the succeeding period of time T_vbr.

$$V\_vbr=V\_vbr+(1-R\_vbr) \times T\_vbr \times b\_av \text{ [Mbit]}$$

By utilizing the virtual buffer V_vbr, an amount of information greater than b_real is allocated to an image showing a relatively high coding difficulty level, whereas an amount of information smaller than b_real is allocated to an image showing a relatively low coding difficulty level.

Figure 13:
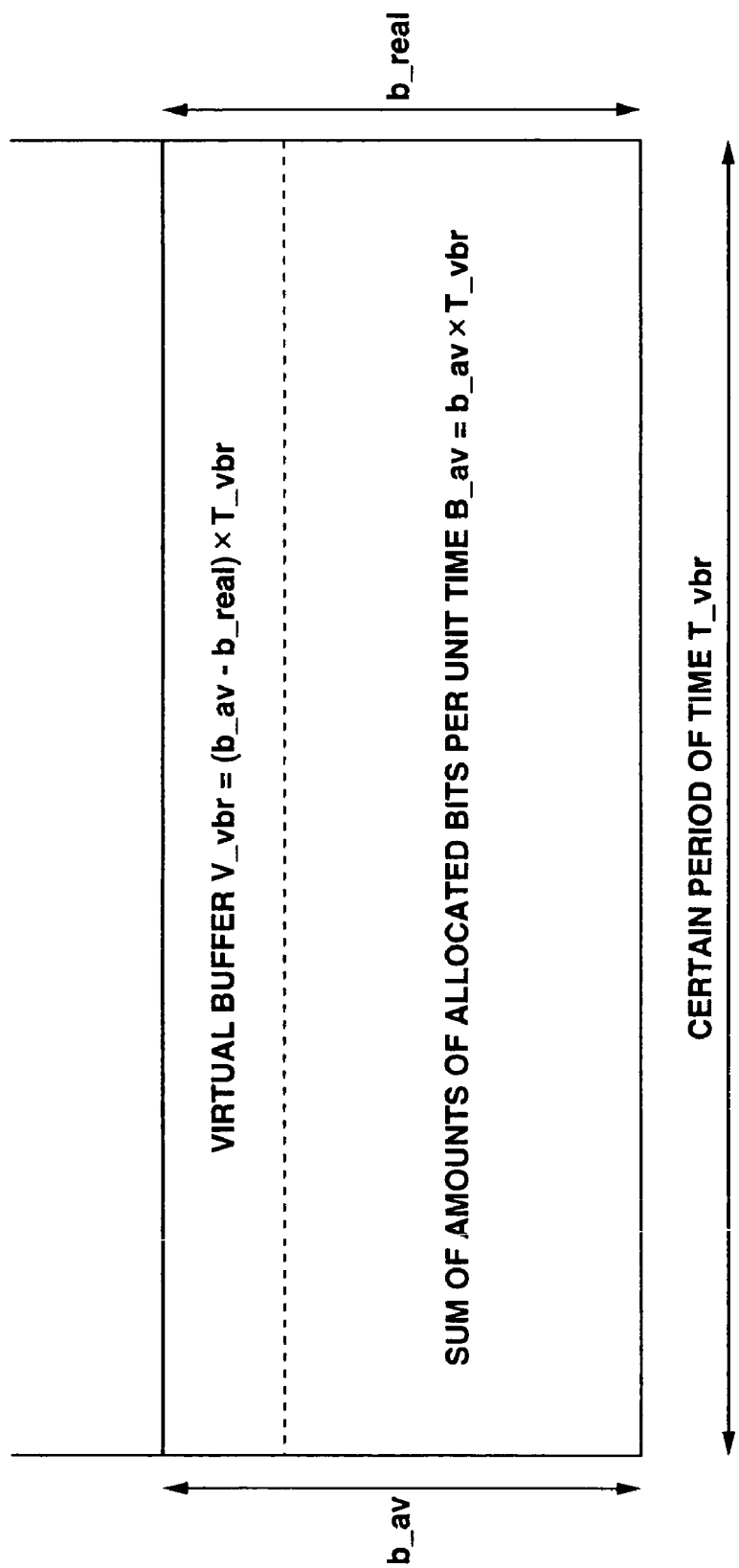
FIG. 13 is a schematic illustration of the concept of virtual buffer.

Now, the concept of virtual buffer will be described by referring to FIG. 13. In FIG. 13, part of the sum B_av (=b_av×T_vbr) of the amounts of allocated bits per unit time obtained for the time period T_vbr is stored in advance as virtual buffer V_vbr. If the amount of bits per unit time of the virtual buffer is v_vbr, V_vbr=v_vbr×T_vbr. Additionally, the reference value b_real of the amount of actually allocated bits per unit time is expressed by b_real=(B_av−V_vbr)/T_vbr. For the time period T_vbr, a value of T_vbr=1 [min] may typically be used.

In Step S55, the coding difficulty level d of the unit time for which the image signal is being coded currently and the visual characteristics R_visual are input to the amount of allocated bits computation circuit/controller 34 for each unit time.

The parameters that can be used for estimating the coding difficulty level d per unit time may include the prediction error of the unit time preceding the above unit time ME_error, the motion vector MV, the index indicating the deviation of the brightness value activity, the amount of generated information b_gene and the Q scale q_scale.

The coding difficulty level computation circuit 33 estimates the coding difficulty level d, using the formula below.

$$d = ME\_error \times W\_ME + MV \times W\_MV + activity \times W\_AC + b\_gene \times W\_GENE + q\_scale \times W\_Q,$$

where
W_ME: weight to the motion prediction error,
W_MV: weight to the motion vector,
W_AC: weight to the deviation of the brightness value
W_GENE: weight to the amount of generated bits and
W_Q: weight to the Q scale.

Figure 7:
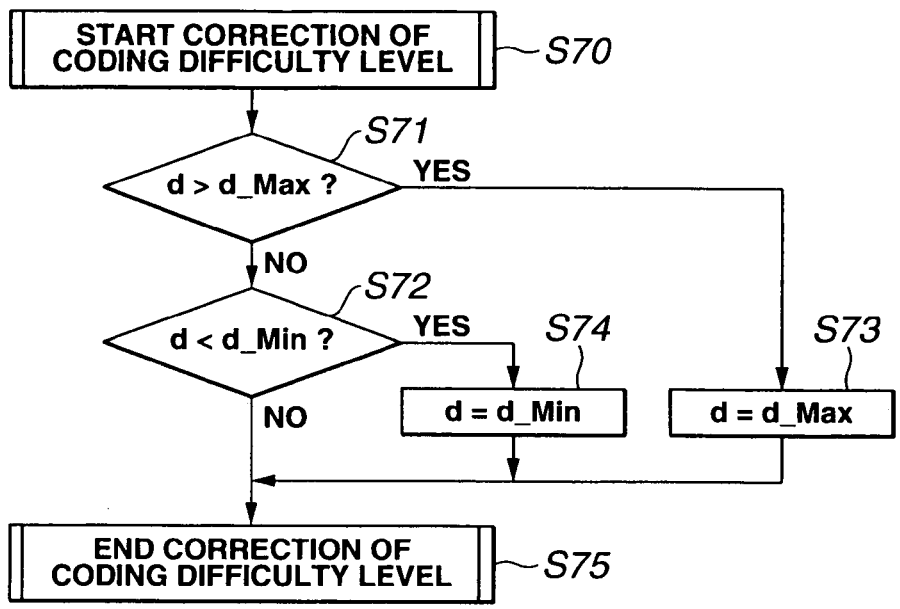
FIG. 7 is a flow chart of the operation of correcting the coding difficulty level in Step S56 of FIG. 6.

In Step S56, the input coding difficulty level d is corrected. This is a processing operation for limiting the coding difficulty level d by means of the upper limit value d_Max and the lower limit value d_Min. FIG. 7 is a flow chart illustrating the operation in detail.

Referring to FIG. 7, the operation of correcting the coding difficulty level is started in Step S70 and, if it is found in Step S71 that the estimated coding difficulty level exceeds the upper limit value d_Max of coding difficulty level, the coding difficulty level of the unit time is determined to be equal to d_Max in Step S73. If, on the other hand, it is found in Step S72 that the estimated coding difficulty level is smaller than the lower limit value d_Min of coding difficulty level, the coding difficulty level of the unit time is determined to be equal to d_Min in Step S74. In other words, if (d>d_Max), d=d_Max;

if (d<d_Min), d=d_Min;

After Steps S72, S73 and S74, the operation of correcting the coding difficulty level ends in Step S75.

Now, returning to FIG. 6, the amount of allocated bits b_x is determined in Step S57 by using the reference value of amount of allocated bits b_real, the coding difficulty level d and the reference value of coding difficulty level d_Avg. In other words, b_x=b_real×d/d_Avg [Mbps]

Figure 8:
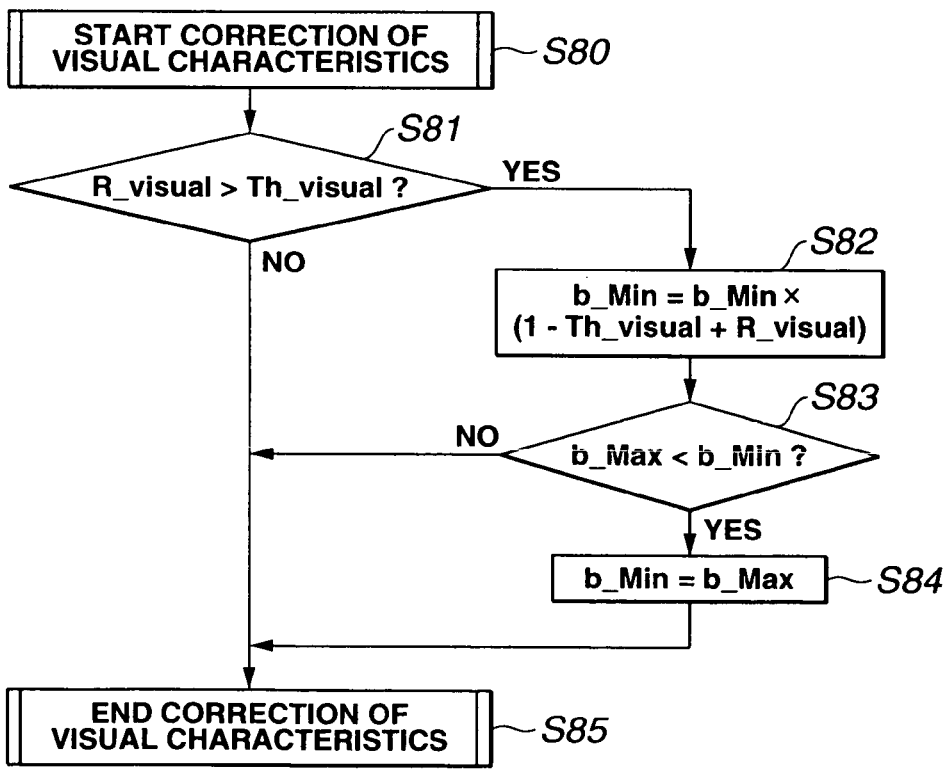
FIG. 8 is a flow chart of the operation of visually correcting the amount of allocated bits in Step S58 of FIG. 6.

In Step S58, the lower limit of amount of allocated bits b_Min is regulated or corrected according to the visual characteristic value R_visual because the perceived degradation of image quality due to the coding operation can vary depending on the visual characteristics of the input image. FIG. 8 shows a flow chart of the operation of Step S58.

Referring to FIG. 8, the operation of correcting the visual characteristic value starts in Step S80 and, if it is found in Step S81 that the visual characteristic value R_visual of the input image is greater than a predetermined value Th_visual, the lower limit b_Min of amount of allocated bits is corrected by using the formula below in Step S82. That is, if (R_visual>Th_visual)

b_Min=b_Min×(1−Th_visual+R_visual);

If it is found in Step S83 that the corrected lower limit value b_Min of amount of allocated bits exceeds the upper limit value b_Max of amount of allocated bits, the lower limit value b_Min is made to be equal to upper limit value b_Max of amount of allocated bits in Step S84. In other words, if (b_Min>b_Max), b_Min=b_Max;

The visual characteristic value as used herein may refer to the ratio of the skin color or the intermediary tones in the input image and be expressed in terms of 0<Th_visual<1 and 0<R_visual<1. Since Th_visual represents a constant value, it may typically be made equal to 0.5. After Steps S81 and S84, the operation of correcting the visual characteristic value ends in Step S85.

Figure 9:
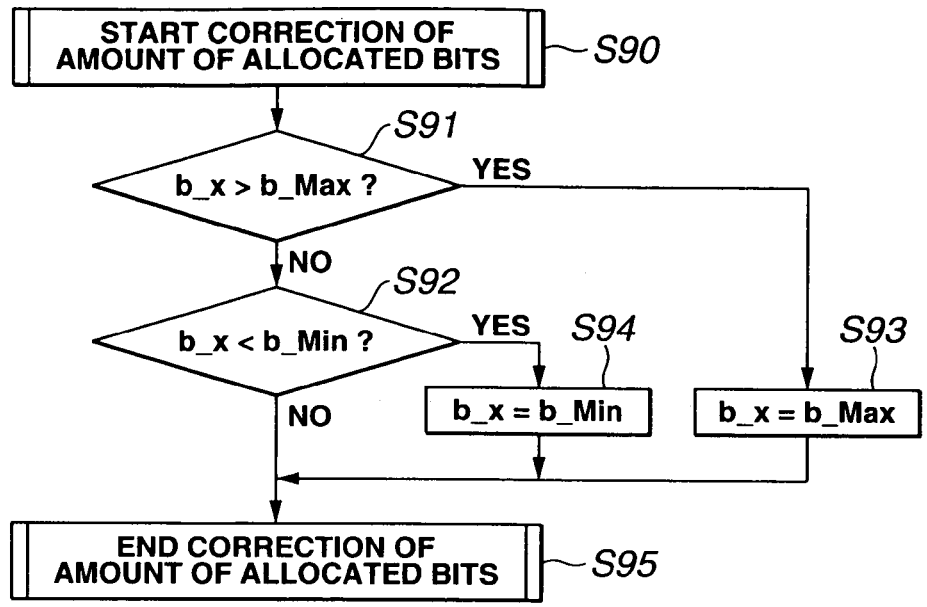
FIG. 9 is a flow chart of the operation of correcting the amount of allocated bits in Step S59 of FIG. 6.

Returning again to FIG. 6, in Step S59, the amount of allocated bits per unit time determined in Step S57 is corrected by referring to the upper limit value b_Max and the lower limit value b_Min of amount of allocated bits that are predetermined. FIG. 9 is a detailed flow chart of the operation of correcting the amount of allocated bits.

Referring to FIG. 9, the operation of correcting the amount of allocated bits starts in Step S90 and, if it is found in Step S91 that the amount of allocated bits b_x exceeds the upper limit value b_Max of amount of allocated bits, the amount of allocated bits is made equal to b_Max in Step S93. If, on the other hand, it is found in Step S92 that the amount of allocated bits b_x is lower than the lower limit value b_Min of amount of allocated bits, the amount of allocated bits is made equal to b_Min in Step S94. In other words, if (b_x>b_Max), b_x=b_Max;

if (b_x<b_Min), b_x=b_Min;

The following values may typically be used respectively for the upper limit value b_Max of amount of allocated bits and the lower limit value of b_Min of amount of allocated bits;

b_Max=2.0 b_real, and b_Min=0.5 b_real;

After Steps S92, S93 and S94, the operation of correcting the amount of allocated bits ends in Step S95.

Figure 10:
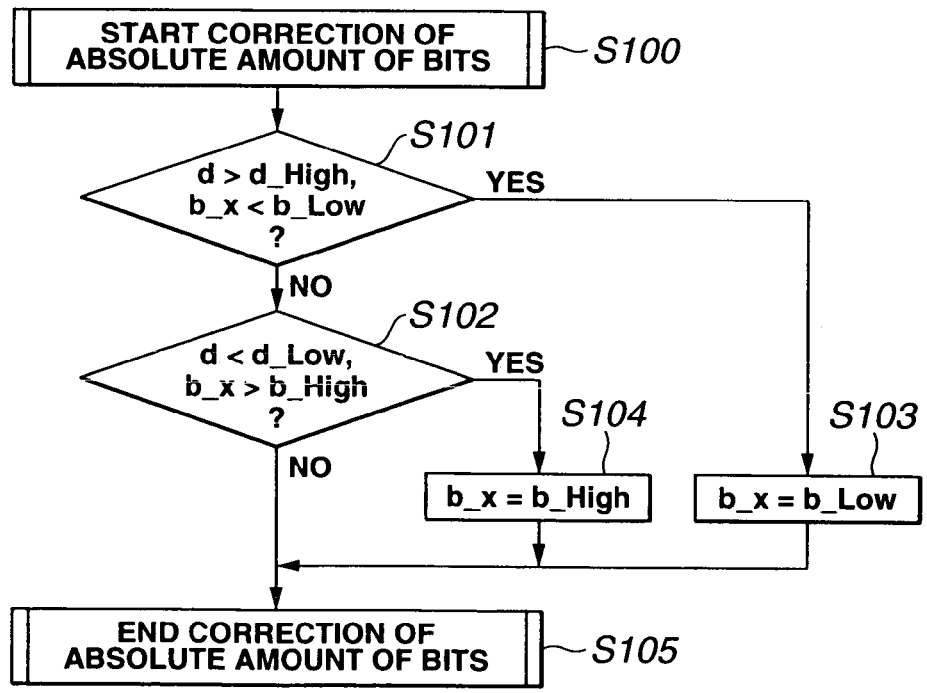
FIG. 10 is a flow chart of the operation of correcting the amount of allocated bits for the absolute coding difficulty level in Step S60 of FIG. 6.

Now back to FIG. 6, the amount of allocated bits is corrected in Step S60 on the basis of the predetermined absolute rating for the coding difficulty level. FIG. 10 is a detailed flow chart of the operation of correcting the absolute amount of bits.

Referring to FIG. 10, the operation of correcting the absolute amount of bits starts in Step S100 and then, if it is determined in Step S101 that the estimated coding difficulty level d exceeds the upper limit of absolute value of coding difficulty level d_High and the amount of allocated bits b_x falls below the lower limit of absolute value of amount of allocated bits b_Low, the amount of allocated bits is made equal to b_Low in Step S103. If, on the other hand, it is determined in Step S102 that the estimated coding difficulty level d falls under the lower limit of absolute value of coding difficulty level d_Lowh and the amount of allocated bits b_x exceeds the upper limit of absolute value of amount of allocated bits b_High, the amount of allocated bits is made equal to b_High in Step S 104. In other words, if (d>d_High && b_x<b_Low)

b_x=b_Low;

if (d<d_Low && b_x>b_High)

b_x=b_High;

The following values may typically be used respectively for the lower limit of absolute value of amount of allocated bits b_Low and the upper limit of absolute value of amount of allocated bits b_High;

b_Low=1.2 b_real, b_High=0.8 b_real;

After Steps S102, S103 and S104, the operation of correcting the amount of allocated bits ends in Step S105.

Referring back to FIG. 6 at step S61, the reference value of coding difficulty level d_Avg is updated according to the reaction speed Reactor, using the coding difficulty level d of the current unit time. In other words, d_Avg=(d_Avg×(1−Reactor)+d×Reactor)

where the reaction speed Reactor is 0<Reactor<1 and may typically be 0.5.

Figure 11:
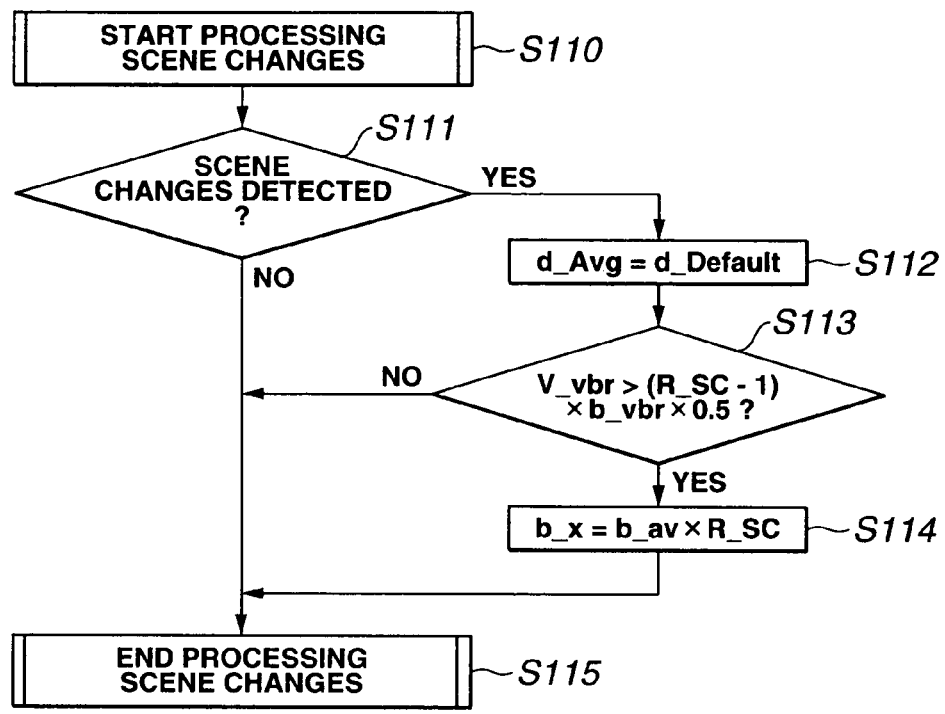
FIG. 11 is a flow chart of the operation of processing a scene change in Step S62 of FIG. 6.

In Step S62, if there is a scene change, a processing operation for the scene change is conducted. FIG. 11 illustrates a detailed flow chart of the operation for processing a scene change.

Referring to FIG. 11, the operation of processing a scene change starts in Step S110 and, if a scene change is detected in Step S111, the reference value of coding difficulty level d_Avg is initialized by initial value d_Default. If it is found in Step S113 that the amount of information necessary for the virtual buffer V_vbr is left, the allocated bit rate is corrected in Step S114 according to the ratio of the allocated bit rate R_SC immediately after the scene change. This processing operation can be expressed as follows;

```
if (scene_change) {
    d_Avg = d_Default;
    if(V_vbr > (R_SC −1) × b_vbr × 0.5) {
        b_x = b_av × R_SC;
    }
}
``` where the ratio of the allocated bit rate R_SC is 1>R_SC and may typically be R_SC=1.5. After Steps S111, S113, S114, the operation of processing the scene change ends in Step S115.

Figure 12:
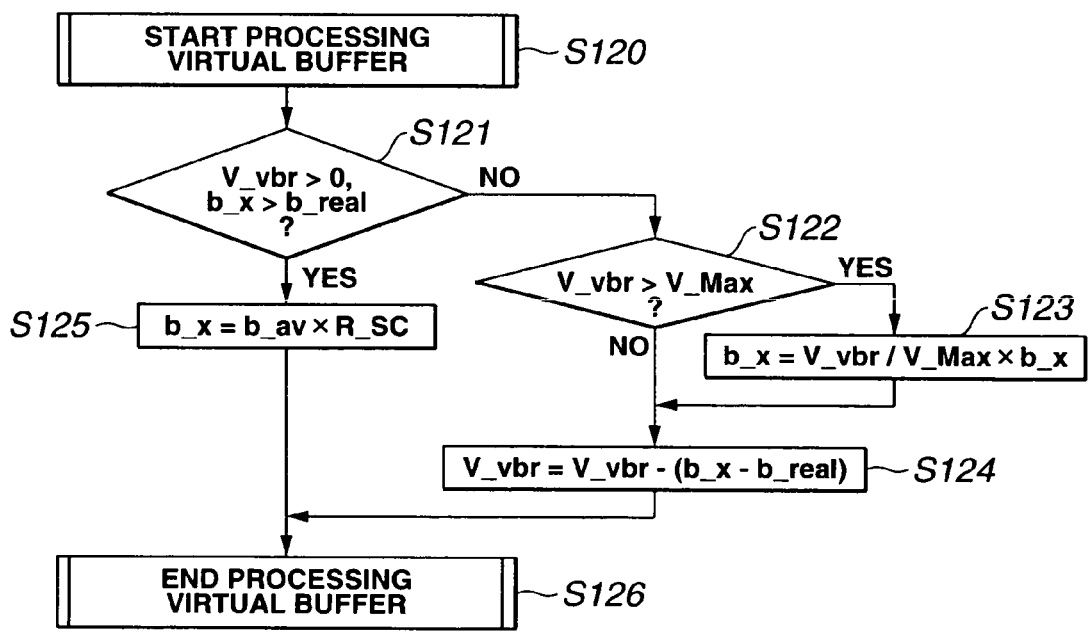
FIG. 12 is a flow chart of the operation of processing a virtual buffer in Step S63 of FIG. 6.

Then, in Step S63 of FIG. 6, a processing operation relating to the virtual buffer V_vbr is carried out. FIG. 12 illustrates a detailed flow chart of the operation of processing the virtual buffer.

Referring to FIG. 12, the operation of processing the virtual buffer starts in Step S120 and, if it is found in Step S121 that the residue of virtual buffer V_vbr is less than 0 and the amount of allocated bits b_x is less than the reference value of amount of allocated bits b_real, the operation proceeds to Step S125, where the amount of allocated bits b_x is made equal to the reference value of amount of allocated bits b_real. In other words, if (V_vbr<0 && b_x>b_real)

b_x=b_real;

Then, if it is found in Step S122 that the virtual buffer V_vbr exceeds the predetermined upper limit value of virtual buffer V_Max, the amount of allocated bits b_x is corrected in Step S123 by using the following formula.

```
if (V_vbr > V_Max) {
    b_x = V_vbr / V_Max × b_x;
}
```

The upper limit value of virtual buffer V_Max may typically be expressed by

V_Max=2.0 V_vbr;

Then, in Step S124, the difference between the amount of allocated bits b_x and the reference value of amount of allocated bits b_real is subtracted from the residue of virtual buffer V_vbr to update the residue of virtual buffer V_vbr. After Steps S125, S124, the operation of processing the virtual buffer ends in Step S126.

Referring again back to FIG. 6, if it is found in Step S64 that the unit time (GOP) for which the processing operation is being conducted is the last unit time of the period of time T_vbr, the operation proceeds to Step S63. Otherwise, the operation returns to Step S55, where the processing operation for the next unit time starts. If it is found in Step S65 that the unit time is the last one for the processing sequence, the operation proceeds to Step S66, where the processing operation ends. Otherwise, the operation returns to Step S55, where the virtual buffer V_vbr is supplemented and the processing operation for the next period of time T_vbr starts.

Now, a signal recording/reproduction apparatus to which this embodiment can be applied will be described in detail by referring to FIG. 14. The apparatus of FIG. 14 is adapted to use a hard disk as recording medium.

Figure 14:
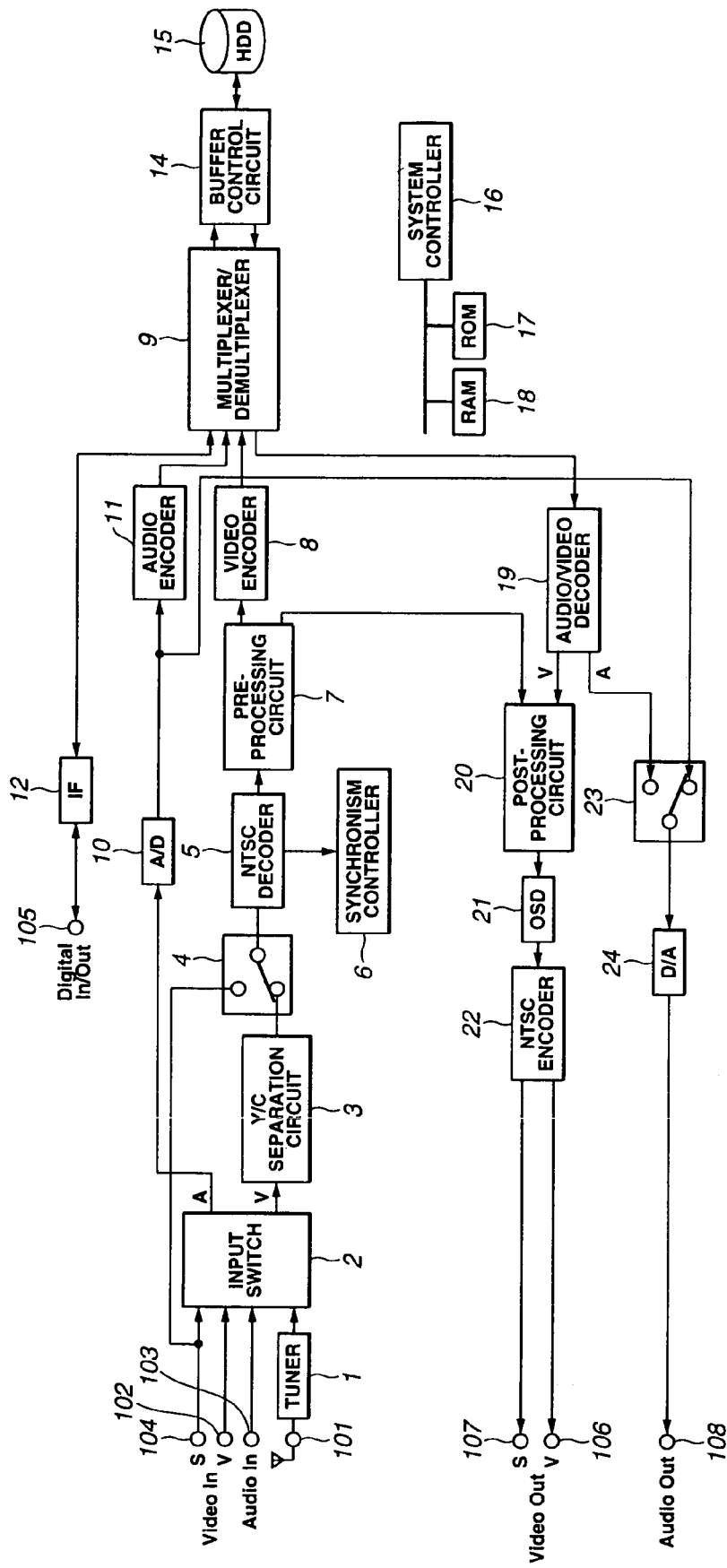
FIG. 14 is schematic block diagram of a signal recording/reproduction apparatus to which an embodiment of encoder according to the invention is applicable.

Referring to FIG. 14, the television broadcast signal received typically by means of an antenna is transmitted to a tuner 1, which may be a terrestrial wave tuner, by way of input terminal 101. The video output and the audio output of the tuner 1 are then fed to an input switch circuit 2. Similarly, the composite video signal and the audio signal from an external source are also fed to the input switch circuit 2 via the input terminal 102 and input terminal 103 respectively. The input switch circuit 2 select the desired signals according to the instruction from system controller 16. The composite video signal is output to Y/C separation circuit 3, while the audio signal is output to audio A/D converter 10.

The system controller 16 controls all the component blocks of the apparatus, which will be described hereinafter. Additionally, if necessary, the system controller 16 accesses and controls ROM (read only memory) 17 and/or RAM (random access memory) 18.

The Y/C separation circuit 3 separates the Y (luminance) signal and the C (chroma) signal out of the composite video signal it receives, generates an elementary stream (ES) of the image and feeds them to input switch 4. The input switch 4 selects either the signal from external S video input terminal 104 or the output of the Y/C separation circuit 3 and feeds the selected signal to NTSC decoder circuit 5.

The video signal input to the NTSC decoder 5 is subjected to A/D conversion, chroma encoding and other operations and converted into a digital component video signal (to be referred to as video data hereinafter), which is then fed to pre-processing (pre-video signal processing) circuit 7. Additionally, the NTSC decoder 5 supplies the clock generated by referring to the horizontal synchronizing signal of the input video signal and the horizontal synchronizing signal, the vertical synchronizing signal and the field discriminant signal obtained by sync separation to sync control circuit 6.

The sync control circuit 6 generates a clock and a sync signal adapted to the timings required for the blocks as will be described hereinafter and supplies them to each of the blocks.

The pre-processing (pre-video signal processing) circuit 7 performs various video signal processing operations such as pre-filtering and noise reduction on the input video data and supplies the processed signal typically to MPEG (moving picture experts group) encoder 8 and post-processing (post-video signal processing) circuit 20.

The MPEG encoder 8 performs various coding operations such as block detection (discrete cosine transform) on the video data from the pre-processing circuit 7, generates an elementary stream (ES) of the image and supplies the coded signal to multiplexer/demultiplexer 9. While the MPEG compression system is used in this embodiment, some other compression system may alternatively be used for the purpose of the invention. Furthermore, the signal may not necessarily be compressed.

On the other hand, the audio signal selected by the input switch circuit 2 is converted into a digital audio signal by the audio A/D converter 10 and then fed to audio encoder 11 which may typically be an MPEG audio encoder. The signal is then compressed by the MPEG audio encoder according to the MPEG format and subsequently an ES is generated so that the signal and the ES are supplied to the multiplexer/demultiplexer 9 as in the case of video signal. As for audio signals, while the MPEG compression system is used in this embodiment, some other compression system may alternatively be used for the purpose of the invention. Furthermore, the signal may not necessarily be compressed.

For a recording operation, the multiplexer/demultiplexer 9 multiplexes the video ES (elementary stream), the audio ES and the various control signals. For a reproducing operation, it separates the transport stream (TS). The multiplexer/demultiplexer multiplexes the MPEG video ES (elementary stream), the MPEG audio ES and the various control signals and typically generates a TS of the MPEG system. Then, it feeds them to buffer control circuit 14.

The buffer control circuit 14 controls the operation of intermittently transmitting the TS that is input continuously to downstream hard disk drive (HDD) 15. For example, since the HDD (hard disk drive) 15 is not available for writing the TS signal when it is seeking data, the TS signal is temporarily stored in a buffer. On the other hand, when the HDD 15 is available for writing the TS signal, the latter is written at a rate higher than the rate at which it is input so that the input TS signal that is input continuously can be recorded without any omission.

The HDD 15 records the TS signal at predetermined addresses under the control of the system controller 16.

While IDE (intelligent drive electronics) is used as protocol for the buffer control circuit 14 and the HDD 15 in this embodiment, the present invention is by no means limited thereto. Similarly, while this embodiment is described above by referring to an HDD as recording medium, it may be replaced by an optical disk, a magneto-optical disk or a solid memory without any problem.

Now, the signal reproducing operation of the embodiment will be described below.

The HDD 15 seeks predetermined addresses to read the TS (transport stream) signal and supplies it to the buffer control circuit 14 under the control of the system controller 16. The buffer control circuit 14 controls the buffer so as to turn the signal that is input intermittently into a continuous signal and feeds the TS signal to multiplexer/demultiplexer 9. The multiplexer/demultiplexer 9 extracts the PES (packetized elementary stream) out of the time stamp and feeds it to AV. (audio/video) decoder 19, which may typically be an MPEG AV decoder.

The MPEG AV decoder 19 separates the video ES and the audio ES of the input PES and feeds them respectively to the video MPEG decoder and the audio MPEG decoder for decoding. As a result of this processing operation, video data and the audio data of base band are obtained and fed to post-processing (post-video signal processing) circuit 20 and switch 23.

The post-processing circuit performs operations such as selecting the video data from the pre-processing (pre-video signal processing) circuit 7, synthetically combining signals and/or filtering signals and supplies the obtained video data to OSD (on screen display) circuit 21.

The OSD circuit 21 generates graphics to be displayed on the display screen and performs other operations such as superimposing them on video data or displaying them in part of the screen. The obtained video data are then fed to the NTSC encoder 22.

The NTSC encoder 22 converts the input video data (component digital signal) into a YC (luminance, chroma signal), which is then subjected to D/A conversion to produce an analog composite video signal and an S video signal, which composite video signal and S video signal are then taken out externally by way of output terminal 106 and output terminal 107 respectively.

Meanwhile, the switch 23 selects either the audio data fed from the MPEG AV decoder 19 or the audio data input from the audio A/D converter 10 so that the selected signal is converted into an analog audio signal by audio A/D converter 24. The analog audio signal from the audio A/D converter 24 is then taken out externally by way of output terminal 108.

Now, the digital signal that is fed and output by way of digital IN/OUT terminal 105 will be described below. When, for example, recording a signal input from an external IRD (integrated receiver decoder) by way of a digital interface such as one conforming to IEEE1394, the digital signal is input to digital interface circuit 12.

The digital interface circuit 12 performs processing operations such as format conversion to make the signal conform to the current system and generates a TS, which is then fed to multiplexer/demultiplexer 9. The multiplexer/demultiplexer 9 analyses and generates a control signal along with other signals and converts the TS into a signal conforming to the current system, which is then fed to the downstream of the apparatus. All the subsequent processing operations are same as those described above for a video data and an audio data. At the same time, the multiplexer/demultiplexer 9 separates the components of the digital signal and supplies the obtained PES to the MPEG AV decoder 19 to obtain an analog video signal and an analog audio signal.

The signal reproducing operation of the digital interface circuit 12 will be described below. The operation down to the multiplexer/demultiplexer 9 is same as the one described above and hence will not be described any further.

Upon receiving the TS signal and if necessary, the multiplexer/demultiplexer 9 analyses and generates a control signal and supplies it to the digital interface circuit 12. The digital interface circuit 12 performs a converting operation that is opposite to the one it performs for recording to produce a digital signal conforming to an external IRD, which digital signal is then output by way of digital IN/OUT terminal 105. At the same time, the multiplexer/demultiplexer 9 performs a processing operation for separation and supplies the PES to the MPEG AV decoder 19 to produce an analog video signal and an analog audio signal. While this embodiment is described in terms of connection to an IRD, it can alternatively be connected to an AV apparatus such as TV set or a personal computer.

While the signal recording medium of FIG. 14 is described above in terms of a hard disk, it may be replaced by any appropriate signal recording medium such as an optical disk, a flexible disk, a magnetic recording medium such as magnetic tape, a semiconductor recording medium such as IC cards or some other memory for recording the signal coded by this embodiment. Optical disks that can be used with an encoder according to the invention include those adapted to record signals on a bit by bit basis and magneto-optical disks along with phase-change type optical disks, organic coloring matter type optical disks, optical disks adapted to be used with an ultraviolet laser beam for recording and optical disks having a multilayer recording film.

What is claimed is:

1. A video signal coding method comprising the steps of:
    determining a coding difficulty level d of an input video signal for each unit of time;
    measuring visual characteristics of the input video signal;
    determining a reference value for allocating coding bits on the basis of temporally b (d) for the amount of coding bits b allocated for each unit of time and related in advance to the coding difficulty level d of said input video signal for each unit of time;
    determining an actual amount of allocated coding bits b x on the basis of the reference value; and
    generating coded data by coding the input video signal for each unit of time on the basis of said actual amount of allocated coding bits b x, wherein part of the sum B_av of the amounts of allocated bits b_av per unit time for a certain period of time T_vbr, or $B\_av = b\_av \times T\_vbr,$ is stored as virtual buffer V_vbr in advance and the actual reference value of the amount of allocated coding bits b_real is obtained by $b\_real = (B\_av - V\_vbr)/T\_vbr$ so that an amount of allocated bits not smaller than b_real is given as long as V_vbr>0 but an amount smaller than b_real is given otherwise in said step of determining the actual amount of allocated coding bits on the basis of said reference value.

2. The video signal coding method according to claim 1, wherein an upper limit is provided in advance according to the amount of allocated bits b_av when giving an amount of allocated bits exceeding said b_real.

3. The video signal coding method according to claim 1, wherein a lower limit is provided in advance according to the amount of allocated bits b_av when giving an amount of allocated bits smaller than said b_real.

4. The video signal coding method according to claim 1, wherein the upper limit is provided according to a proportion of scenes that are conspicuously degraded as a result of coding by taking the visual characteristics of the input image into consideration when giving an amount of allocated bits smaller than said b_real.

5. The video signal coding method according to claim 1, wherein, when the difference between the sum of the amounts of actually generated bits B_gene in the period of time and the sum of the amounts of available bits B_av in the period of time (B_av−B_gene) is positive when the coding operation in said period of time T_vbr is over, the difference is carried over and added to the sum of the amounts of available bits in the next period of time.

6. The video signal coding method according to claim 1, wherein, when the sum of the amounts of available bits exceeds R_total times of the initial sum B_av as a result of carrying over the difference, the reference value of the actually allocated bits per unit time b_real is raised according to the ratio.

7. A video signal encoder comprising:
    a means for determining a coding difficulty level d of an input video signal for each unit of time;
    a means for measuring visual characteristics of the input video signal;
    a means for determining a reference value for allocating coding bits on the basis of temporally b (d) for an amount of coding bits b allocated for each unit of time and related in advance to the coding difficulty level d of said input video signal for each unit of time;
    a means for determining an actual amount of allocated coding bits b x on the basis of the reference value; and
    a means for generating coded data by coding the input video signal for each unit of time on the basis of said actual amount of allocated coding bits b x, wherein said means for determining the actual amount coding bits on the basis of the reference value controls the actual amount of allocated bits in such a way that the sum of the generated bits obtained when coding the input video signal for a certain period of time T_vbr does not exceed the amount of bits available for recording a signal having the length of the period of time T_vbr on a recording medium.

8. A video signal encoder comprising:
    a means for determining a coding difficulty level d of an input video signal for each unit of time;
    a means for measuring visual characteristics of the input video signal;
    a means for determining a reference value for allocating coding bits on the basis of temporally b (d) for an amount of coding bits b allocated for each unit of time and related in advance to the coding difficulty level d of said input video signal for each unit of time;
    a means for determining an actual amount of allocated coding bits b_x on the basis of the reference value; and
    a means for generating coded data by coding the input video signal for each unit of time on the basis of said actual amount of allocated coding bits b_x, wherein part of the sum B_av of the amounts of allocated bits bay per unit time for a certain period of time T_vbr, or $B\_av = b\_av \times T\_vbr,$ is stored as virtual buffer V_vbr in advance and the actual reference value of the amount of allocated coding bits b_real is obtained by $b\_real = (B\_av - V\_vbr)/T\_vbr$ so that an amount of allocated bits not smaller than b_real is given as long as V_vbr>0 but an amount smaller than b_real is given otherwise in said step of determining the actual amount of allocated coding bits on the basis of said reference value.

9. The video signal encoder according to claim 8, wherein an upper limit is provided in advance according to the amount of allocated bits b_av when giving an amount of allocated bits exceeding said b_real.

10. The video signal encoder according to claim 8, wherein a lower limit is provided in advance according to the amount of allocated bits b_av when giving an amount of allocated bits smaller than said b_real.

11. The video signal encoder according to claim 8, wherein the lower limit is determined as according to a proportion of scenes that are conspicuously degraded as a result of coding by taking the visual characteristics of the input image into consideration when giving an amount of allocated bits smaller than said b_real.

12. The video signal encoder according to claim 8, wherein, when the difference between the sum of the amounts of actually generated bits B_gene in the period of time and the sum of the amounts of available bits B_av in the period of time (B_av−B_gene) is positive when the coding operation in said period of time T_vbr is over, the difference is carried over and added to the sum of the amounts of available bits in the next period of time.

13. The video signal encoder according to claim 8, wherein, when the sum of the amounts of available bits exceeds R_total times of the initial sum B_av as a result of carrying over the difference, the reference value of the actually allocated bits per unit time b_real is raised according to the ratio.

14. A video signal coding method comprising the steps of:
utilizing a virtual buffer;
allocating an amount of information greater than b_real to an image showing a relatively high coding difficulty level where b_real is obtained by $$b\_real = (B\_av) \times (R\_vbr); \text{ and}$$

controlling a bit rate based on an amount of residue, where the amount of residue is obtained by $$(b\_real - b\_av) \times (T\_vbr);$$

wherein an amount of information smaller than b_real is allocated to an image showing a relatively low coding difficulty level.

* * * * *

UNITED STATES PATENT AND TRADEMARK OFFICE
CERTIFICATE OF CORRECTION

PATENT NO. : 7,006,570 B2  
APPLICATION NO. : 09/905051  
DATED : February 28, 2006  
INVENTOR(S) : Nobuhiro Igi et al.

Page 1 of 1

It is certified that error appears in the above-identified patent and that said Letters Patent is hereby corrected as shown below:

At column 2, line 58, change "S40" to --S403--.
At column 3, lines 37 and 38, change "B_gene" to -- B_gen--.
At column 3, line 59, change "B_gene" to -- B_gen--.
At column 3, line 65, change "B_gene" to -- B_gen--.
At column 5, line 8, change "B_av-B_gene" to -- B_av-B_gen--.
At column 5, line 15, change "B_av-B_gene" to -- B_av-B_gen--.
At column 5, line 21, change "B_ av-B_gene" to -- B_av-B_gen--.
At column 5, line 30, change "B_av-B_gene" to -- B_av-B_gen--.
At column 4, line 1, change "B_gene" to -- B_gen--.
At column 8, line 62, change "b_gene" to -- b_gen--.
At column 8, line 67, change "nay" to -- may--.
At column 9, line 28, change "b_gene" to -- b_gen--.
At column 10, line 16, change "B_gene" to -- B_gen--.
At column 10, line 18, change "B_av-B_gene" to -- B_av-B_gen--.
At column 11, line 15, change "b_gene" to -- b_gen--.
At column 11, line 18, change "+b_gene" to -- +b_gen--.
At column 11, line 19, change "GENE+q" to -- GEN+q--.
At column 11, line 24, change "W_GENE" to -- W_GEN--.
At column 17, line 29, change "b x" to -- b_x--.
At column 17, line 33, change "b x" to -- b_x--.
At column 17, line 64, change "B_gene" to -- B_gen--.
At column 18, line 21, change "b x" to -- b_x--.
At column 18, line 24, change "b x" to -- b_x--.
At column 19, line 11, change "B_gene" to -- B_gen--.
At column 19, line 13, change "B_av-B_gene" to -- B_av-B_gen--.
At column 20, line 11, change "residue" to -- residual--.

Signed and Sealed this

Fifth Day of December, 2006

JON W. DUDAS  
*Director of the United States Patent and Trademark Office*